US007231436B1

(12) United States Patent
Dalfó et al.

(10) Patent No.: US 7,231,436 B1
(45) Date of Patent: Jun. 12, 2007

(54) OBJECT-BASED MACHINE AUTOMATION METHOD AND SYSTEM

(75) Inventors: Ricard Roma i Dalfó, Bellevue, WA (US); Karel Blaha, Jr., Renton, WA (US); James Elder, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/579,160

(22) Filed: May 25, 2000

(51) Int. Cl.
*G06F 15/173* (2006.01)

(52) U.S. Cl. .................. 709/223; 709/224; 709/225; 709/227; 705/1; 705/12

(58) Field of Classification Search ............... 709/223, 709/224, 225, 227
See application file for complete search history.

(56) References Cited

U.S. PATENT DOCUMENTS

| 6,199,111 B1* | 3/2001 | Hara et al. ................ 709/227 |
| 6,199,180 B1* | 3/2001 | Ote et al. ................... 714/31 |
| 2002/0002609 A1* | 1/2002 | Chung et al. ............. 709/223 |

OTHER PUBLICATIONS

Drive Image—Complete Data Protection and Backup Solution "Driveimage Information", © PowerQuest Corporation.
Norton Ghost Enterprise Edition "Norton Ghost 6.0 Enterprise Edition Product Info" © 1995-2000 Symantec Corporation.
IEEE Internet Computing, vol. 2, No. 1, Jan./Feb. 1998 "Virtual Network Computing", The Olivetti & Oracle Research Laboratory.
Virtual Network Computing "VNC documentation", AT&T Laboratories Cambridge 1999.
Virtual Network Computing What is VNC?—A practical introduction, AT&T Laboratories Cambridge.

\* cited by examiner

*Primary Examiner*—Jason Cardone
*Assistant Examiner*—Adrian M. Mirza
(74) *Attorney, Agent, or Firm*—Merchant & Gould P.C.

(57) ABSTRACT

Automation objects are implemented in a client-server model to control operations on one or more client machines from a single machine automation control module, such as a test program. The machine automation control module instantiates machine automation server objects in a server process. The control module can then instruct the server objects to instantiate corresponding machine automation client objects on specified client machines via a connection mechanism. Object-oriented automation classes are provided in a library and may be extended to meet customized requirements of a given testing procedure. Examples of automation objects may include, without limitation, application objects, machine image objects, snapshot objects, file and registry access objects, reboot objects, autologon objects, and command execution objects. Automation objects allow the re-establishment of remote control after the loss of control resulting from a reboot, a relogon, or a disk image restoration, for example. Automation objects may also be used to automate the deployment of software throughout an enterprise.

33 Claims, 4 Drawing Sheets

OBJECT-BASED MACHINE AUTOMATION METHOD AND SYSTEM

TECHNICAL FIELD

The invention relates generally to computing machine automation, and more particularly to object-based software test automation and deployment.

BACKGROUND OF THE INVENTION

Software testing is an important stage of a software product development process. Ideally, a software testing process exhaustively tests as many user scenarios and machine configurations as possible, including installs, reinstalls, reboots, logons, multiple system configurations, etc. Identifiable user scenarios and machine configurations are numerous, and tests often require significant manual interaction to configure and execute. The complexity of modern testing requirements combined with manual interaction can introduce unnecessary errors, labor costs, and delays to the software testing process.

One approach to minimize the risks of manual errors, costs, and delays is to automate the testing process. Test automation software exists to decrease the manual interaction required, but these existing solutions are not architected to fully or flexibly support the complex testing requirements of a modern software product development process. Example testing requirements not adequately addressed by existing solutions are related to scenarios such as loss of control (e.g., reboots, hard disk image restores, and logouts) and remote test control of multiple test client machines from a single test server machine.

SUMMARY OF THE INVENTION

In accordance with the present invention, the above and other problems are solved by an object-based client-server machine automation system. An embodiment of the present invention provides machine automation objects implemented in a client-server model to control operation (e.g., testing) of one or more machine automation client systems from a single machine automation control module (e.g., a test program). Object-oriented machine automation classes are provided in a library and may be extended to meet customized requirements of a given testing procedure. Examples of machine automation objects may include, without limitation, application objects, machine image objects, snapshot objects, file and registry access objects, reboot objects, autologon objects, and command execution objects.

For example, one machine automation scenario may involve software testing. An exemplary test configuration may include a test server computer system and one or more test client computer systems. To specify a test procedure, test personnel develop and execute a test control module on the test server to create server-side automation objects and their corresponding client-side automation objects. Using a communication mechanism, such as DCOM (Distributed Component Object Mode), the server-side automation objects interact with their client-side counterparts during the testing process to perform automated test operations. When a loss of control scenario (e.g., a client-side reboot) is executed, the server-side objects re-instantiate and re-establish with their client-side counterparts after the reboot is complete.

In addition to test automation, automation objects may also be employed in software deployment and other machine automation scenarios. For example, automation objects may be developed to automate the operations for remotely installing new software on client systems within a given enterprise.

A machine automation system for automating control of a client machine under control of a server process is provided. A communications mechanism couples the server process to the client machine. A machine automation server object is adapted to execute in the server process. A machine automation client object is adapted to execute on the client machine in communication with the machine automation server object via the communications mechanism. A machine automation control module initiates the machine automation server object in the server process and instructs the machine automation server object to initiate the machine automation client object on the client machine via the communications mechanism to control operation of the client machine.

A method for automating control of a client machine under control of a server process is provided. A machine automation control module executes in the server process. A machine automation server object is initiated in the server process, under command of the machine automation control module. The machine automation server object is coupled to the client machine via a communications mechanism. The machine automation server object is instructed to initiate a machine automation client object on the client machine via the communications mechanism. The machine automation server object is instructed to cause the machine automation client object to control operation of the client machine.

In other implementations of the present invention, articles of manufacture are provided as computer program products. One embodiment of a computer program product provides a computer program storage medium readable by a computer system and encoding a computer program for executing a computer process for automating control of a client machine. Another embodiment of a computer program product may be provided in computer data signal embodied in a carrier wave by a computing system and encoding the computer program for automating control of a client machine.

A computer program product for automating control of a first client machine and a second client machine under control of a server process via a communications mechanism is provided. A machine automation control module is executed in the server process. A first machine automation server object is initiated in the server process, under command of the machine automation control module. The first machine automation server object is instructed to initiate a first machine automation client object on the first client machine. A second machine automation server object is initiated in the server process, under command of the machine automation control module. The second machine automation server object is instructed to initiate a second machine automation client object on the second client machine. The first machine automation server object is instructed to cause the first machine automation client object to control operation of the first client machine. The second machine automation server object is instructed to cause the second machine automation client object to control operation of the second client machine.

A great utility of an embodiment of the present invention includes machine automation objects that are provided to abstract the implementation details of instantiating and communicating with client-side machine automation code via a communications mechanism. The ability to remotely control operation of a client computer before and after a loss of control scenario also provides advantages of the prior art. Additionally, the ability to provide machine automation control of multiple network-coupled client machines through an object interface using a single machine automation control module in an advancement over the existing machine automation approaches.

These and various other features as well as advantages, which characterize the present invention, will be apparent from a reading of the following detailed description and a review of the associated drawings.

DETAILED DESCRIPTION OF THE INVENTION

An embodiment of the present invention provides machine automation objects implemented in a client-server model to control operation of one or more client machines from a single machine automation control module. A machine automation configuration, such as a test automation configuration, includes a server process, running in either a server or a client machine, and a client process, running in a client machine. The machine automation control module executes in the server process and initiates a machine automation server object. The machine automation control module specifies a given client machine and instructs the machine automation server object to create a machine automation client object in the client process on the specified client machine.

A variety of machine automation objects, including shutdown objects, application objects, (disk) image objects, system information objects, process information objects, and file and registry access objects, may be commanded by the machine automation control module. Application objects, for example, can install an application on the client machine. When a loss of control scenario occurs (e.g., a reboot, a log off, etc.), the machine automation server object re-establishes communications with the machine automation client object on the client machine after the reboot/relogon operation completes.

Through one or more machine automation server objects, a machine automation control module may control operations on multiple client machines from a single server process and code set. The machine automation control module can pass different client machine identifiers to different machine automation server objects. Via a communications mechanism, each machine automation server object can then instantiate a corresponding machine automation client object on a client machine specified by a provided client machine identifier.

A machine automation server object may control a corresponding machine automation client object, and as such, the client object can accept instructions from the server machine through the communications mechanism. In one embodiment of the present invention, a client machine identifier and instructions are dependent on a given communications mechanism, such that the identifier obeys the communications mechanism's rules or protocols for naming computer resources. It should be understood, however, that alternative embodiments might be implemented to work in multiple network environments with heterogeneous communication protocols within the scope of the present invention.

Figure 1:
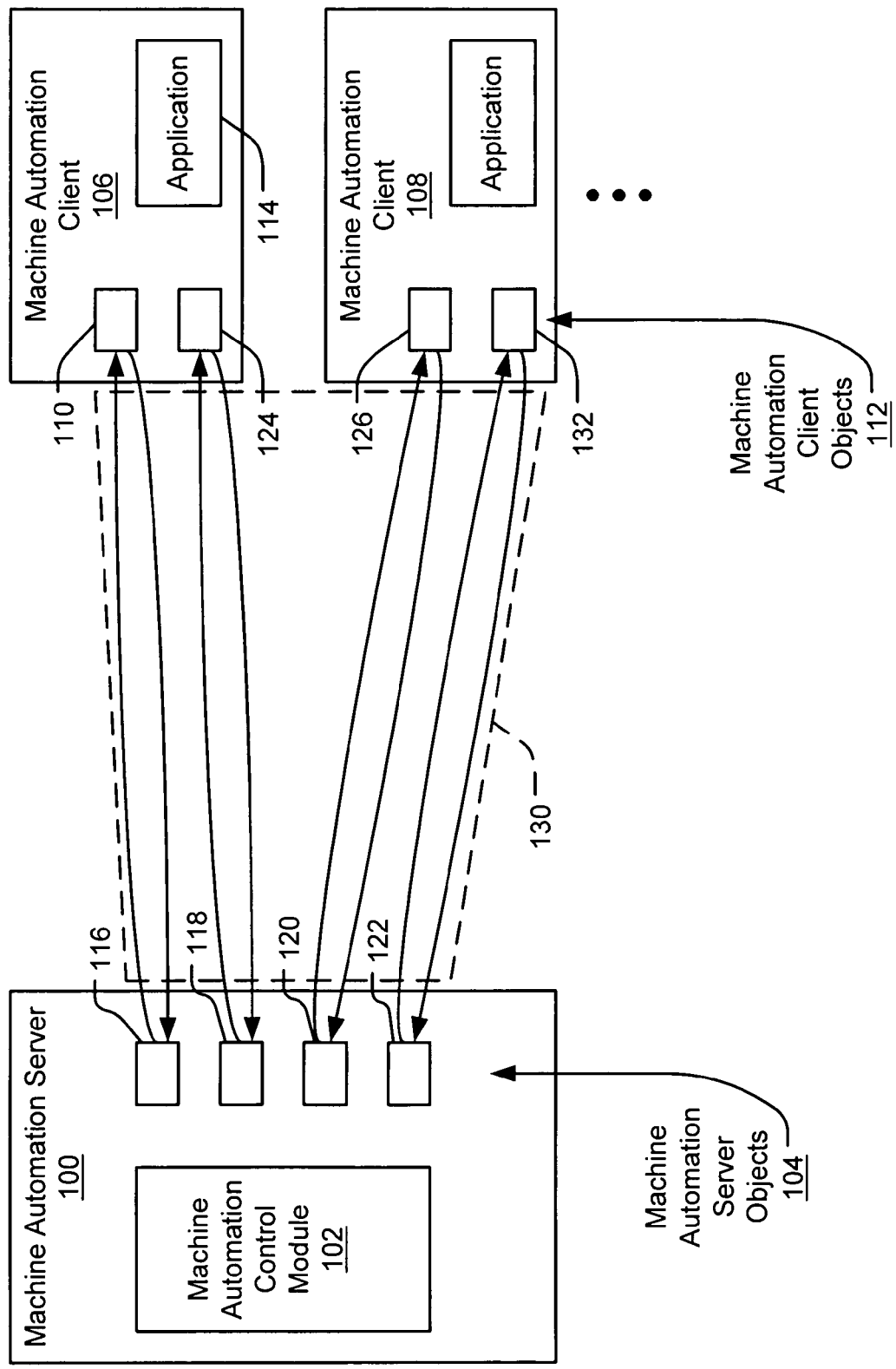
FIG. 1 depicts an exemplary machine automation configuration in an embodiment of the present invention.

FIG. 1 depicts an exemplary machine automation configuration in an embodiment of the present invention. The machine automation server 100 is a computer system (see the description in FIG. 2) coupled to one or more machine automation clients 106 and 108 via a network connection (not shown). The machine automation server 100 can access a machine automation control module 102 to obtain and execute instructions (e.g., a set of test codes or commands) for controlling operations on the client machines. The machine automation control module 102 may be coded in any programming language, including without limitation Visual Basic (VB), VBScript, Visual C/C++, intermediate code languages, and other scripting languages. In one embodiment of the present invention, the machine automation control module 102 is coded in a programming language capable of creating COM (Component Object Model) objects and calling method in the COM object interfaces. Alternatively, programming languages that support other object or component-based standards may be employed in other embodiments of the present invention.

As such, a machine automation control module 102 can be developed in at least one of many programming languages to control multiple machine automation clients 106 and 108, including the complex automation scenarios of a client machine reboot (and reconnection), log ins and log outs on the client machine, disk image restorations, application installations, and other machine or application configuration scenarios. It should be understood that more than one machine automation control module might also be employed to control operation on one or more machine automation clients.

In a testing scenario, for example, the machine automation server 100 may be configured to operate as a test automation server for testing various installation configurations relating to an application 114 on a client machine, restoring a disk image on a client machine, logging in and out of user sessions on a client machine, or other testing scenarios relevant to a software development process, a hardware development process, a systems integration process, performance or compatibility testing, etc. The system configurations of the machine automation client 106 and the machine automation client 108 may be the same or different. For example, the clients may share a network connection to the machine automation server 100 or be coupled to the machine automation server 100 by separate network connections. Furthermore, the internal configurations of the machine automation clients 106 and 108 may differ, such as including different peripheral devices, different microprocessors, a different number of microprocessors, different software configurations, and different operating systems. In addition to testing scenarios, embodiments of the present invention may be employed in software deployment scenarios for installing and configuring software on remote computer systems and in other system administration scenarios.

In the process of executing the instructions or commands of the machine automation control module 102, one or more machine automation server objects 104 may be instantiated for different aspects of the automation scenario. The machine automation control module 102 controls operations on one or more client machines through the machine automation server objects 104, and therefore through one or more machine automation client objects 112, which may be instantiated in correspondence to the machine automation server objects 104. Each machine automation server object 104 is instantiated from a library of automation classes loaded on or accessible by the machine automation server 100. Likewise, each machine automation client object 112 is instantiated from a library of automation classes loaded on or accessible by the machine automation clients 106 and 108. Objects are software modules that can encapsulate both data and functionality. "Classes", which define objects, may be extended through inheritance to define customized objects, although the capability of being inheritable is not a requirement of all classes or objects.

In an embodiment of the present invention, a machine automation object is a COM object that also satisfies a set of rules so that the object may be used by a scripting language. For example, in the illustrated embodiment, an automation object may implement an IDispatch interface and use automation-compatible types (i.e., types supported by other automation objects, such as Visual Basic supported types). In an alternative embodiment, a machine automation server object may be a non-COM object (e.g., a C/C++ object) capable of communicating with a corresponding client object or process to control operation of the client machine. Other object models are contemplated within in the scope of the present invention and may include, without limitation, the System Object Model (SOM).

In the illustrated embodiment, the machine automation server object 116 is instantiated from an automation class, responsive to an instruction or command of the machine automation control module 102. Once instantiated, the machine automation server objects 116 may be instructed to instantiate a corresponding machine automation client object 110 on a specified machine automation client 106. In one embodiment, the machine automation control module 102 calls an "Init" method in the machine automation server object 116, passing a client machine identifier (e.g., machine name or number) identifying the machine automation client 106, to instantiate the client object 110 thereon. In this embodiment, the machine automation control module 102 acts as a machine identifier source by passing the machine identifier to the server object in a method call. Alternatively, the machine identifier could be provided by a configuration file, a registry, a network query identifying available client machines on the network, and other types of machine identifier sources.

The instantiation of the machine automation client object 110 is achieved over a network connection via a communication mechanism 130, such as DCOM (Distributed Component Object Model), which was developed by Microsoft Corporation, or DSOM (Distributed System Object Model), an implementation of CORBA (Common Object Request Broker Architecture). CORBA is an architecture that enables objects to communicate with one another regardless of the programming languages in which the objects were written or on which operating system they are running.

It should be understood that the server process, which executes the machine automation control module and the one or more machine automation server objects, and the client process, which executes the one or more machines automation client objects, may be running on the same machine (e.g., a machine automation client, which represents the machine that is being controlled by the machine automation control module). In such an automation scenario, client and server objects may communicate using COM as the communications mechanism.

The machine automation client and server objects 112 and 104 abstract the complexity of interprocess communications (e.g., DCOM, DSOM, COM, and SOM) from the automation user. That is, the automation user need only develop a machine automation control module 102 that understands how to create server objects and to access methods and properties in the server objects. The machine automation objects 112 and 104 transparently perform the necessary interactions between the machine automation clients and servers via the communications mechanism.

After the machine automation server object 116 and the corresponding machine automation client object 110 are instantiated, the two objects interact via the communications mechanism 130 in accordance with client/server model. Generally, the machine automation control module 102 provides instructions to the machine automation server object 116, which calls appropriate methods in the machine automation client object 110. The machine automation client object 110 affects operation of the machine automation client 106 in accordance with the programming of the method (e.g., rebooting the system, installing the application 114, etc.).

If the action of the machine automation client object 110 does not result in a loss of control, the machine automation client object 110 will synchronously or asynchronously return results of the action to the machine automation server object 116. Exemplary actions that do not generally result in a loss of control include, without limitation, client registry accesses or system information collections. If the response is synchronous, the machine automation server object 116 processes the result (e.g., by returning the result to the machine automation control module 102) to complete operation of the server method. Thereafter, the next instruction of the machine automation control module 102 is executed. That is, in a synchronous response, the next instruction of the machine automation control module 102 is not executed until the specified operation of the machine automation client 110 has completed from the previous instruction. Synchronous responses are particularly useful for quick actions at the client machine, such as registry accesses, file information queries, etc.

Alternatively, synchronous responses are also useful for enforcing a particular sequence of client machine operations. For example, in one automation scenario, an installation of Microsoft Office 97 may be followed by an upgrade to Microsoft Office 2000. In this scenario, it is generally not desirable to start the upgrade operation until after the first installation operation is complete. Accordingly, synchronous responses can ensure the sequential execution of these operations.

If the response is asynchronous, the result is deferred and a status is returned to the machine automation server object 116, which passes execution to the next instruction of the machine automation control module 102. At a subsequent time in the execution to the machine automation control module 102, an instruction causes the machine automation server object 116 to request the result from the machine automation client object 110, which returns the result to the machine automation server object 116 in its response. Asynchronous responses are particularly useful for time-consuming actions at the client machine, such as some application installations, creation and restoration of hard disk images, and execution of lengthy executables, batch files, and commands. In this manner, the machine automation control module 102 may initiate an operation on a one client machine, and quickly retain control of the server processing to initiate another operation on a second client machine while the automation operation of the first machine automation client continues concurrently.

If the action of the machine automation client object 110 results in a loss of control (e.g., a reboot or a log off situation), the machine automation client 106 terminates the machine automation client object 110 in the course of the action. For example, if the machine automation client 106 reboots (e.g., by virtue of an operation system call by the client object 110), all processes executing on the machine automation client 106 are terminated, including the machine automation client object 110 and the client side of the communication mechanism 130 between the machine automation client object 110 and the machine automation server object 116.

An embodiment of the present invention is designed to handle loss of control scenarios. For example, a reboot object pair (i.e., a reboot server object and a corresponding reboot client object) are provided, such that the reboot server object can re-instantiate and re-establish communications (e.g., a status return) with the reboot client object after the reboot process completes. In one embodiment, the reboot server object causes the reboot client object to reboot the client machine. Thereafter, the reboot server object unsuccessfully attempts to re-instantiate the reboot client object through DCOM while the machine automation client is rebooting. After the machine automation client successfully reboots and connects to the network, the reboot server object's attempts to re-instantiate the reboot client object are then successful. Communications between the reboot server object and the reboot client object via DCOM are then re-established. Thereafter, subsequent instructions from the machine automation control module to the reboot server object may be communicated to the reboot client object to control the operation of the client machine.

As illustrated in FIG. 1, a single machine automation control module 102 and a single machine automation server 100 can control operation of multiple clients. As shown, the machine automation control module 102 can instantiate and provide instructions to multiple machine automation server objects 116,118,120, and 122. Through the machine automation server objects 104, the machine automation control module 102 can also initialize corresponding machine automation client objects 110,124,126, and 132 by specifying to each server object an identifier of a given machine automation client.

For example, to control operation of machine automation client 106, the machine automation control module 102 can instruct creation of the machine automation server object 118. The machine automation control module 102 then instructs the machine automation server object 118 to initialize (i.e., instantiate) the machine automation client object 124 on the machine automation client 106 by passing an appropriate machine identifier (e.g., name or number indicating the machine automation client 106) in an Init method call to the server object 118. The Init method then instantiates the machine automation client object 124 on the specified machine automation client 106 via the communications mechanism 130 (e.g., DCOM).

Likewise, to control operation on machine automation client 108, the machine automation control module 102 can also instruct creation of machine automation server object 120. The machine automation control module 102 then instructs the machine automation server object 120 to initialize the machine automation client object 126 on the machine automation client 108 by passing the machine identifier (e.g., a name or number indicating the machine automation client 108) in an Init method call to the server object 120. The Init method then instantiates the machine automation client object 126 on the specified machine automation client 108 via the communications mechanism 130.

In an alternative embodiment, the machine automation control module 102 can be executed independently for separate client machines (e.g., executing the same automation module multiple times by passing in a different target client machine as a command line parameter each time). In a multi-threaded server system, the identical automation control module sequences (as defined by a single automation control module 102) can be executed asynchronously or independently to control different client machines.

In yet another embodiment, multiple machine automation control modules, on a single server or on multiple servers, may be executed to control the same client machine. For example, a first machine automation control module may be executed to perform an application installation on a client machine, while a second machine automation control client may be executed to monitor the installation process at specified stages (e.g., querying values of certain environment variables, recording snapshots of the registry or file system, etc.).

In an embodiment of the present invention, machine automation objects (i.e., server and client pairs) are categorized as utilities objects and application objects. Generally, utilities objects relate to control scenarios targeted at a given machine automation client. In contrast, application objects relate to the relatively more complex sequence of actions directed at installing an application on a given machine automation client. Exemplary machine automation objects (i.e., server and client pairs) are described in Tables 1-15.

TABLE 1

BTLog Object

| Object, Function, or Property | Description |
| --- | --- |
| BTLog | The BTLog object includes methods for logging events, test conditions, test results (e.g., pass/fails), and other information generated during the machine automation process. This information, for example, is useful for reporting and interpreting test results in an automated testing system. In one embodiment, the BTLog object supports logging methods similar to those supported in an office automation system. |

TABLE 1-continued

BTLog Object

| Object, Function, or Property | Description |
|---|---|
| Init | The Init method accepts a machine identifier and causes a BTLog client object to be instantiated on the specified machine automation client. |
| LogClose | The LogClose method accepts a string comment parameter, which it appends to the end of the log. The method then fishes the logging process by closing the open log. The method returns a Boolean value indicating whether the method was successful. |
| LogGetLoggingFolder | The LogGetLogging Folder method retrieves a pathname to the folder that is open and receiving log information. The method returns a string identifying the current logging folder, or an empty string if the method fails. |
| LogOpen | The LogOpen method opens a log for the given object. The method is passed the name of the log, the log file name, a description of the log, and a comment for the beginning of the log file. The method returns a Boolean value indicating whether the method was successful. |
| LogSetOptions | The LogSetOptions method sets optional for a new log. For example, an APPEND option may be set to indicate that a new log is to be appended to the end of the old log file by the same name (the default is that the old log is overwritten). The method returns a Boolean value indicating whether the method was successful. |
| LogStatus | The LogStatus method logs an entry into the open log file for a given object. The method is passed a string indicating the logging user; an enumerated value indicating the type of log event (e.g., Comment, Error, AppIdle, ASSERT, etc.); another enumerated value indicating success, failure, warning, or error; and a comment passed as a string. The method returns a Boolean value indicating whether the method was successful. |

TABLE 2

Execute Object

| Object, Function, or Property | Description |
|---|---|
| Execute | The Execute object is related to execution of programs, scripts etc. on a machine automation client. |
| Init | The Init method accepts a machine identifier and causes an Execute client object to be instantiated on the specified machine automation client. |
| ExecuteCommand | The ExecuteCommand causes a command, passed in as a string parameter, to be executed on the machine automation client as though it were executed from the Run command on the Start Menu of the machine automation client. This method returns a Boolean value indicating whether the method was successful. Also, a program or script taking longer than the TimeOutSeconds property value results in a return value of FALSE (e.g., for hung programs). |
| TimeOutSeconds | The TimeOutSeconds property represents the number of seconds before a program terminates. By default, the number is 1200 seconds. If this value to set to zero, the program is launched asynchronously, meaning that the program or script is launched while the method returns TRUE to the calling server object without waiting for the program or script to complete. |

TABLE 3

FileInfo Object

| Object, Function, or Property | Description |
|---|---|
| FileInfo | The FileInfo object returns information about files from the machine automation client. The object also provides methods for manipulating files on the machine automation |

TABLE 3-continued

FileInfo Object

| Object, Function, or Property | Description |
| --- | --- |
| | client. File operations, such as copying, moving, creating, deleting, etc., may be accomplished through this object. |
| Init | The Init method accepts a machine identifier and causes a FileInfo client object to be instantiated on the specified machine automation client. |
| CreateDirectory | The CreateDirectory method accepts a directory name string as an input parameter and creates the directory having that name. |
| DirectoryExists | The DirectoryExists method returns a Boolean indicating whether a specified directory exists on the machine automation client. |
| FileCopy | The FileCopy method accepts two file name strings and a file operation flag as input parameters. The method copies file(s) specified by the first file name parameter to the location specified by the second file name parameter. Wildcards, such as * and ?, are valid. The file operation flags may include, for example, a flag that indicates that only files should be copied, that both files and directories should be copied, or that a file or directory is to be renamed if there is a name collision at the destination. The method returns a Boolean value indicating whether the method was successful. For example, the function can fail if: the user has inadequate permissions to write to the destination location; the system has inadequate storage space to copy file; or the paths provided in the call to the method are incorrect. |
| FileDelete | The FileDelete method accepts a file name string and a file operation flag as input parameters. The method deletes the file(s) specified by the file name parameter. Wildcards, such as * and ?, are valid. The method returns a Boolean value indicating whether the method was successful. |
| FileExists | The FileExists method accepts a file name string as an input parameter. The method returns a Boolean value indicating whether the specified file(s) exists. Wildcards, such as * and ?, are valid. |
| FileMove | The FileMove method accepts two file name strings and a file operation flag as input parameters. The method moves the file(s) specified by the first file name parameter to the location specified by the second file name parameter. Wildcards, such as * and ?, are valid. The file operation flags may include, for example, a flag that indicates that only files should be moved, that both files and directories should be moved, or that a file or directory is to be renamed if there is a name collision at the destination. The method returns a Boolean value indicating whether the method was successful. |
| FileRename | The FileRename function accepts two file name strings and a file operation flag as input parameters. The method renames the file specified by the first file name parameter to the location or name specified by the second file name parameter. Wildcards, such as * and ?, are valid. The file operation flags may include, for example, a flag that indicates that only files should be renamed, that both files and directories should be renamed, or that a file or directory is to be renamed if there is a name collision at the destination. The method returns a Boolean value indicating whether the method was successful. |
| GetFileCreationTime | The GetFileCreationTime method accepts a file name string as an input parameter. The method returns a date object indicating the time and date that the specified file was created. If the method encounters an error (e.g., the file does not exist), the method returns a date object representing 12:00 AM Dec. 30th, 1899. |
| GetFileLanguageIdentifier | The GetFileLanguageIdentifier method accepts a file name string as an input parameter. The method returns the language identifier of the specified file as an enumerated language identifier. If the method encounters an error (e.g., the file does not exist), the method returns 0. |
| GetFileLastAccessTime | The GetFileLastAccessTime method accepts a file name string as an input parameter. The method returns a date object indicating the date and time that the specified file was last accessed. If the method encounters an error (e.g., the file does not exist), the method returns a date object representing 12:00 AM Dec. 30th, 1899. |

TABLE 3-continued

FileInfo Object

| Object, Function, or Property | Description |
| --- | --- |
| GetFileLastWriteTime | The GetFileLastWriteTime method accepts a file name string as an input parameter. The method returns a date object indicating the date and time that the specified file was last accessed. If the method encounters an error (e.g., the file does not exist), the method returns a date object representing 12:00 AM Dec. 30th, 1899. |
| GetFileSize | The GetFileSize method accepts a file name string as an input parameter. The method returns the size of the specified file. If the method encounters an error (e.g., the file does not exist), the method returns 0. |
| GetFileVersionInfo | The GetFileVersionInfo method accepts a file name string as input parameter. The method returns the version number of the specified file. If the method encounters an error (e.g., the file does not exist), the method returns 0. |
| GetProductVersionInfo | The GetProductVersionInfo method accepts a product name string as an input parameter. The method returns the version number of the product. If the method encounters an error (e.g., the file does not exist), the method returns 0. |
| NetAddConnection | The NetAddConnection method allows a user to add a connection to a network share or printer. Input parameters include a local name string, a remote name string, a user name string, a password string, and a Boolean reconnect flag. The local name string specifies the name to which the automation user wishes to map the shared resource. The remote name string specifies the network path to the resource that the automation user wants to map. The user name string specifies the user name used to connect the resource (current user if null). A password string specifies the password used to connect the resource. The reconnect flag specifies whether the user wishes to re-establish the connection after the reboot. |
| NetCancelConnection | The NetCancelConnection method allows a user to terminate a connection to a network share or printer. Input parameters include a resource name string, a Boolean reconnect flag, and a Boolean force flag. The resource name string specifies the resource that the automation user wishes to disconnect (either the network share/printer or the local name). The reconnect flag specifies whether the automation user wishes to re-establish the connection after the reboot. The force flag specifies whether the automation user wishes to force termination of a given connection, such as to force termination of a connection to a resource that has a file open via the connection. |
| RemoveDirectory | The RemoveDirectory method accepts a directory name string as an input parameter and removes the directory having that name. |
| SetFilePermissions | The SetFilePermissions method allows a user to set permissions of files or directories on the client machine. Input parameters include a filename string, a trustee string, an access mode enumerated value, an access permissions enumerated value, and an inheritance flag. The filename string indicates the path to the file or directory for which the user wishes to change permissions. The trustee string specifies the user name or a domain/username for which the user wishes to set permissions. The access mode value defines whether the user wishes to grant access, set access, the deny access, or revoke access. The access permissions value defines the type of permissions the user is granting, revoking, setting, or denying. |

TABLE 4

Images Object

| Object, Function, or Property | Description |
| --- | --- |
| Images | The Images object is used to create and restore an image of a given disk of the machine automation client. |
| Init | The Init method accepts a machine identifier and causes an Images client object to be instantiated on the specified machine automation client. |

TABLE 4-continued

Images Object

| Object, Function, or Property | Description |
|---|---|
| PQDIArguments | The PQDIArguments property allows a user to specify arguments for an application (e.g., PDQI.exe) that creates or restores an image. PQDI refers to "Power Quest Drive Image", used in an embodiment of the present invention. Other disk image techniques are also contemplated within the scope of the present invention. |
| TimeOut | The TimeOut property specifies the maximum time to wait for the client machine to create or restore an image. By default, the property is set to 1200 seconds. If the create or restore image operation (e.g., PQDICreateImage or PQDIRestoreImage) has not completed within the specified time, the method returns FALSE to indicate that the method failed. |
| PQDICreateImage | The PQDICreateImage method allows a user to create a disk image of a client hard drive. The method accepts an image name string as an input parameter and creates a named image of the entire hard drive, including all partitions. The method automatically reboots to DOS (Disk Operating System), creates the named image on a network location, and reboots to the native OS (Operating System) of the client. The method returns a Boolean value indicating whether the method was successful. |
| PQDIRestoreImage | The PQDIRestoreImage method allows a user to restore a disk image of a client hard drive. The method accepts an image name string as an input parameter and restores the named image of the entire hard drive, including all partitions, thereby overriding the previous contents of the hard drive. The method automatically reboots to DOS, restores the named image from a network location to the client's hard drive, and reboots to the native OS of the client. The method returns a Boolean value indicating whether the method was successful. |

TABLE 5

OASys Object

| Object, Function, or Property | Description |
|---|---|
| OASys | The OASys object provides extended functionality when running scripts under an office automation system framework, which manages automation scripts, schedules tests, manages a results database, etc. |
| Init | The Init method accepts a machine identifier and causes an OASys client object to be instantiated on the specified machine automation client. |
| GetScenarioMachineName | The GetScenarioMachineName method accepts one parameter specifying the machine identifier in a given scenario. |

TABLE 6

ProcessInfo Object

| Object, Function, or Property | Description |
|---|---|
| ProcessInfo | The ProcessInfo object provides functions relating to processes running on the machine automation client. |
| Init | The Init method accepts a machine identifier and causes a ProcessInfo client object to be instantiated on the specified machine automation client. |
| IsProcessRunning | The IsProcessRunning method accepts a process name string as an input parameter. The method returns a Boolean flag indicating whether the named process is currently running. |

TABLE 6-continued

ProcessInfo Object

| Object, Function, or Property | Description |
|---|---|
| KillProcess | The KillProcess method accepts a process name string as an input parameter. The method returns a Boolean flag indicating whether the name process was successfully terminated. |

TABLE 7

Registry Object

| Object, Function, or Property | Description |
|---|---|
| Registry | The Registry object provides functions for manipulating and viewing information from the WINDOWS registry and .INI files on the machine automation client. |
| Init | The Init method accepts a machine identifier and causes a Registry client object to be instantiated on the specified machine automation client. |
| INIDeletePrivateProfileKey | The INIDeletePrivateProfileKey method accepts a section string, a key string, and a .INI file name string from as input parameters. The method deletes the specified key from the specified section of the specified .INI file. The method returns a Boolean value indicating whether the method was successful. |
| INIDeletePrivateProfile-Section | The INIDeletePrivateProfileSection method accepts a section string and a .INI file name string as input parameters. The method deletes the specified section from the specified .INI file. The method returns a Boolean value indicating whether the method was successful. |
| INIGetPrivateProfileInt | The INIGetPrivateProfileInt method accepts a section string, a key string, and .INI filename string as input parameters. The method returns an integer value for a specified key from the specified section of the specified .INI file. The method returns a Boolean value indicating whether the method was successful. |
| INIGetPrivateProfileString | The INIGetPrivateProfileString method accepts a section string, a key string, and a .INI filename string and input parameters. The method returns a string associated with a specified key from the specified section of the specified .INI file. The method returns a Boolean value indicating whether the method was successful. |
| INIWritePrivateProfileSection | The INIWritePrivateProfileSection method accepts a section string and a .INI filename string as input parameters. The method creates the specified section in the specified .INI file. The method returns a Boolean value indicating whether the method was successful. |
| INIWritePrivateProfileString | The INIWritePrivateProfileString method accepts a section string, a .INI key string, a value string, and a filename string as input parameters. The method writes the specified string to a specified key in the specified section of the specified .INI file. The method returns a Boolean value indicating whether the method was successful. |
| RegCreateKey | The RegCreateKey method accepts a pathname parameter and a key string as input parameters. The method creates the specified registry key in the given path. The method returns a Boolean value indicating whether the method was successful. |
| RegDeleteKey | The RegDeleteKey method accepts a pathname parameter and a key string as input parameters. The method deletes the specified registry key in the given path. The method returns a Boolean value indicating whether the method was successful. |
| RegDeleteValue | The RegDeleteValue method accepts a pathname parameter, a key string, and the value name string as input parameters. The method deletes a specified value beneath the specified registry key in the given path. The method returns a Boolean value indicating whether the method was successful. |

TABLE 7-continued

Registry Object

| Object, Function, or Property | Description |
| --- | --- |
| RegExistKey | The RegExistKey method accepts a pathname parameter and a key string as input parameters. The method returns a Boolean value indicating whether the specified key exists in the given path. |
| RegExistValue | The RegExistValue method accepts a pathname parameter, a key string, and value name string as input parameters. The method returns a Boolean value indicating whether the specified value exists in the specified key in the given path. |
| RegQueryValueDWORD | The RegQueryValueDWORD accepts a pathname string, a key string, and a value name string as input parameters. The method returns a DWORD from the specified value in the specified registry key in the given path. If there is an error, the function returns 0. |
| RegQueryValueString | The RegQueryValueString accepts a pathname string, a key string, and a value name string as input parameters. The method returns a string from the specified value in the specified registry key in the given path. If there is an error, the function returns an empty string. |
| RegSetValueDWORD | The RegSetValueDWORD accepts a pathname string, a key string, a value name string, and a DWORD value as input parameters. The method sets the specified value in the specified registry key to the specified DWORD value. If there is an error, the function returns 0. |
| RegSetValueString | The RegSetValueDWORD accepts a pathname string, a key string, a value name string, and a string value as input parameters. The method sets the specified value in the specified registry key to the specified string value. If there is an error, the function returns an empty string. |

TABLE 8

Shutdown Object

| Object, Function, or Property | Description |
| --- | --- |
| ShutDown | The ShutDown object provides functions relating to reboots, log ons, and shutdowns. |
| Init | The Init method accepts a machine identifier and causes a ShutDown client object to be instantiated on the specified machine automation client. |
| TimeAfterReboot | The TimeAfterReboot property specifies the minimum time that the server object waits after reboot of the client machine before returning control to the machine automation control module after a reboot/relogon/logoff method call. The default is one minute. This property allows a user to postpone the continuation of a machine automation control module until a specified amount of time after a reboot/relogon is complete to allow predetermined startup tasks on the client machine to complete. |
| TimeOut | The TimeOut property specifies the maximum amount of time the machine automation server object waits for the machine automation client to return after rebooting. The default is set to 20 minutes. If the reboot/relogon/logoff operation has not completed within the timeout period, the reboot/relogon/logoff method returns FALSE to the machine automation control module. |
| Logoff | The Logoff method allows a user to log off of a machine automation client. |
| Reboot | The Reboot method reboots the machine automation client. The method waits until the machine automation client has successfully rebooted and the machine automation client object has reconnected with the machine automation server object before returning and allowing the machine automation control module to continue. |

TABLE 8-continued

Shutdown Object

| Object, Function, or Property | Description |
| --- | --- |
| Relogon | The Relogon method changes the AutoLogon user and then reboots the machine automation client. The method returns a Boolean value indicating whether the method was successful. |
| RemoveAutoLogon | The RemoveAutoLogon method removes the Register settings set by SetAutoLogon, thereby disabling the automatic logon feature. The method returns a Boolean value indicating whether the method was successful. |
| SetAutoLogon | The SetAutoLogon method sets the registry settings that allow a user to be automatically logged on to the machine automation client after reboot. The method returns a Boolean value indicating whether the method was successful. |
| ShutDown | The ShutDown method reboots the machine automation client. The method waits until the machine automation client has successfully rebooted and the machine automation client object has reconnected with the machine automation server object before returning and allowing the machine automation control module to continue. |

In one embodiment, certain methods may produce undesirable effects if the machine automation server object executes in a server process of a machine and the machine automation client object executes in a client process of the same machine. For example, in a loss of control scenario, if a reboot method is invoked, both the server and client objects are terminated as the system reboots. As such, there is no object or automation module that remains executing toreestablish control of the automation. However, an alternative embodiment may provide for automatic execution of an automation module after reboot so that the requisite server and client objects are recreated, their states are restored, and the automation sequence is resumed after the reboot instruction. One method of accomplishing this is to record persistent instructions (e.g., in an autostart script) that are executed after reboot to recreate the automation objects, to restore the object states, and to continue execution of the automation module after the reboot instruction.

TABLE 9

Snapshot Object

| Object, Function, or Property | Description |
| --- | --- |
| Snapshot | The Snapshot object provides functions for taking snapshots of a machine automation client's registry or associated files. The object can also generate differences between two snapshots. In one embodiment, a snapshot can include a textual file listing of all of or a subset of files located in any specified drive on a target computer. In an alternative embodiment, a snapshot can include a list of registry keys and values found on a target computer. |
| Init | The Init method accepts a machine identifier and causes a Snapshot client object to be instantiated on the specified machine automation client. |
| DoDiff | The DoDiff method accepts two input file strings and an output file string as input parameters. The method outputs the differences between the two specified input snapshot files into the output file. The method returns a Boolean flag indicating whether the method was successful. Calculating a difference between two snapshots can produce a list of files or registry keys that were modified, added, or deleted between the times the snapshots were recorded. |
| DoDiffSubset | The DoDiffSubset takes a snapshot of a specified portion of a specified registry or associated files. The method returns a Boolean flag indicating whether the method was successful. |
| DoSnapshot | The DoSnapshot method accepts a file pathname string, a registry pathname string, an output file string, a file CRC Boolean value, and a "tokenize paths" Boolean flag as input parameters. The method takes a snapshot of a specified registry or file. The third parameter specifies the output file name. The fourth parameter specifies whether the user wants a file CRC generated. The file CRC can be used to identify changes in the snapshot file. The fifth parameter |

TABLE 9-continued

Snapshot Object

| Object, Function, or Property | Description |
| --- | --- |
| | allows for the output file to be tokenized (e.g., "<<SYSDIR>>\oleaut32.dll". The method returns a Boolean flag indicating whether the method was successful. |

TABLE 10

SystemInfo Object

| Object, Function, or Property | Description |
| --- | --- |
| SystemInfo | The SystemInfo object provides functions relating to system information on the machine automation client, such as computer name, computer operating system, etc. |
| Init | The Init method accepts a machine identifier and causes a SystemInfo client object to be instantiated on the specified machine automation client. |
| GetAllUsersProfileDirectory | A user profile contains user-specific information and is stored in a profile directory. When a user logs into a system, personal user settings and files are stored therein. An all users profile contains user settings that are common to all users. The GetAllUserProfileDirectory function returns the directory in which the all users profile is stored. |
| GetAnsiCodePage | The GetAnsiCodePage method returns an enumerated value representing the ANSI Code page in use by the machine automation client. If there is an error, the function returns 0. |
| GetCurrentDirectory | The GetCurrentDirectory method returns a string indicating the current directory that is being accessed on the machine automation client. |
| GetDefaultUserProfileDirectory | A default user profile contains user-specific information for a user that does not have a specific profile (e.g., for a newly generated user). The GetDefaultUserProfileDirectory function returns the directory in which the default users profile is stored. |
| GetEnvironmentVariable | The GetEnvironmentVariable method accepts an environment string as an input parameter. The method returns a string indicating the value of the specified environment variable. On error, the method returns an empty string. |
| GetFolderPath | The GetFolderPath method accepts an enumerated parameter indicating a system information folder. The method returns a pathname to the specified folder. On error, the method returns an empty string. |
| GetOS | The GetOS method returns an enumerated value representing the operating system of the machine automation client. On error, this method returns 0. |
| GetOS_IsNT | The GetOS_IsNT method returns a Boolean value indicating whether the operating system of the machine automation client is WINDOWS NT. |
| GetProfilesDirectory | A user profile contains user-specific information and is stored in a profile directory. When a user logs into a system, personal user settings and files are stored therein. The GetProfilesDirectory function returns the directory in which the profile of a specified user is stored. |
| GetSystemDefaultLangID | The GetSystemDefaultLangID returns an enumerated value indicating the default language of the machine automation client. On error, the method returns an empty string. |
| GetSystemDirectory | The GetSystemDirectory method returns a string indicating the system directory on the machine automation client. On error, the method returns an empty string. |
| GetTempPath | The GetTempPath method returns a string indicating temporary directory (e.g., "c:\windows\temp") on the machine automation client. On error, this method returns an empty string. |
| GetUserProfileDirectory | The GetUserProfileDirectory method returns a string indicating the user profile directory on the machine automation client. On error, this method returns an empty string. |
| GetWindowsDirectory | The GetWindowsDirectory method returns a string indicating the WINDOWS directory on the machine automation client. On error, this method returns an empty string. |
| IsLoggedUserAdmin | The IsLoggedUserAdmin method returns a Boolean value indicating whether the user that is currently logged onto the machine automation client is part of the administrators group. |

TABLE 11

TimeDate Object

| Object, Function, or Property | Description |
| --- | --- |
| TimeDate | The TimeDate object provides functions that relate to time and dates on the machine automation client. |
| Init | The Init method accepts a machine identifier and causes a TimeDate client object to be instantiated on the specified machine automation client. |
| GetLocalTime | The GetLocalTime method returns the current local time from the machine automation client. On error, the function returns 0. |
| GetLocalTimeDay | The GetLocalTimeDay method returns the current day on the machine automation client. On error, the function returns 0. |
| GetLocalTimeDayOfWeek | The GetLocalTimeDayOfWeek method returns the current day of the week from the machine automation client. On error, the function returns 0. |

TABLE 11-continued

TimeDate Object

| Object, Function, or Property | Description |
| --- | --- |
| GetLocalTimeHour | The GetLocalTimeHour method returns the current hour from the machine automation client. On error, the function returns 0. |
| GetLocalTimeMilliseconds | The GetLocalTimeMilliseconds method returns the current number of milliseconds from the machine automation client. On error, the method returns 0. |
| GetLocalTimeMinute | The GetLocalTimeMinute method returns the number of current minutes from the machine automation client. On error, the method returns 0. |
| GetLocalTimeMonth | The GetLocalTimeMonth method returns the current number of minutes from the machine automation client. On error, the method returns 0. |
| GetLocalTimeSecond | The GetLocalTimeSecond method returns the current number of seconds from the machine automation client. On error, the method returns 0. |
| GetLocalTimeYear | The GetLocalTimeYear method returns the current number of years from the machine automation client. On error, the method returns 0. |
| SetLocalTime | The SetLocalTime accepts a year value, a month value, a date value, an hours value, a minutes value, a seconds value, and a milliseconds value as input parameters. The method sets the current local time on the machine automation client. The method returns a Boolean value indicating whether the method was successful. |

TABLE 12

ToolsManagement Object

| Object, Function, or Property | Description |
| --- | --- |
| ToolsManagement | The ToolsManagement object allows a user to perform machine automation library control operations on the machine automation client. |
| Init | The Init method accepts a machine identifier and causes a ToolsManagement client object to be instantiated on the specified machine automation client. |
| TimeOut | The TimeOut value specifies the maximum amount of time to wait for the machine automation client to return after a ToolsManagement-related operation. |
| UpdateTools | The UpdateTools method updates the machine automation library on the machine automation client. |
| VerifyToolsInstalled | The VerifyToolsInstalled method allows a user to verify that the appropriate machine automation library is installed on the machine automation client. |

TABLE 13

UserGroup Object

| Object, Function, or Property | Description |
| --- | --- |
| UserGroup | The UserGroup object provides functions for managing users and groups on a machine automation client running WINDOWS NT. |
| Init | The Init method accepts a machine identifier and causes a UserGroup client object to be instantiated on the specified machine automation client. |
| GetLocalGroupName | The GetLocalGroupName accepts a group identifier as an input parameter. The method returns a string indicating the name of the specified group on the machine automation client. |
| NetLocalGroupAdd | The NetLocalGroupAdd method accepts a group name string as an input parameter. The method adds the specified local group to the machine automation client. The method returns a Boolean value indicating whether the method was successful. |
| NetLocalGroupAddMember | The NetLocalGroupAddMember method accepts a group name string and a domain/user name string as input parameters. The method adds the specified domain/user to the specified local group on the machine automation client. The method returns a Boolean value indicating whether the method was successful. |
| NetLocalGroupDel | The NetLocalGroupDel method accepts a group name string as input parameter. The method deletes the specified local group from the machine automation client. The method returns a Boonlean value indicating whether the method was successful. |
| NetLocalGroupDelMember | The NetLocalGroupDelMember method accepts a group name string and a domain/user name string as input parameters. The method deletes the specified domain/user from the specified local group on the machine automation client. The method returns a Boolean value indicating whether the method was successful. |
| NetUserAdd | The NetUserAdd method accepts a name string and a password string as input parameters. The method adds the specified user to the machine automation client. The method returns a Boolean value indicating whether the method was successful. |
| NetUserChangePassword | The NetUserChangePassword method accepts a domain name string, a user name string, an old password string, and a new password string as input parameters. The method changes the password for the specified user on the machine automation client. The method returns a Boolean value indicating whether the method was successful. |
| NetUserDel | The NetUserDel method a user name string and a password string as input parameters. The method deletes the specified user from the machine automation client. The method returns a Boolean value indicating whether the method was successful. |

TABLE 14

WindowsInstaller Object

| Object, Function, or Property | Description |
|---|---|
| WindowsInstaller | The WindowsInstaller object provides functions for managing product installations on the machine automation client. |
| Init | The Init method accepts a machine name and causes a WindowsInstaller client object to be instantiated on the specified machine automation client. |
| WIInstalledWindowsInstaller | The WIInstalledWindowsInstaller allows a user to determine whether a Windows installer is installed on the machine automation client. |
| WIMsiEnumProducts | The WIMsiEnumProducts method accepts a zero-based index relating to the number of times the method has been called. The method should be called initially with the index of 0, and the method will return a product code for an installed product. The method can be called the next time with an index of 1 to get the product code of another installed product, and so on. |
| WIMsiGetProductInfo | The WIMsiGetProductInfo method accepts a product code string and a product property string as input parameters. The method returns the requested information about the specified product. |

An application object is generally directed at installing and configuring an application on a machine automation client. Types of application objects may include without limitation objects for installing: software application office suites, operating system update packages (e.g., service packs for Windows NT), applications supporting various languages, and various versions of a given application. For example, one application object, called "JpnOff2000sr1PrmCD1", installs a Japanese language version of Office 2000 SR1 Premium CD1. An alternative application object, called "EngIE5", installs English Internet Explorer 5.x.

Application objects can include a variety of methods and properties. In an embodiment of the present invention, application objects include at least an "init" method, an "install" method, and a "source" property. However, alternative embodiments may have an alternative minimum set of methods and properties. Table 15 describes exemplary methods and properties that may be included, in any combination that meets the requirements of the associated application and operation (e.g., installation, upgrade, etc.), in an application object of an embodiment of the present invention. Some properties may also be given default values to eliminate the need for the machine automation module to set them. Each application object may be associated with a given application or a given version of a given application, including one of various language versions, install media versions, product versions, etc.

TABLE 15

Methods and Properties of an Exemplary Application Object

| Application Object Method or Property | Description |
|---|---|
| Init | The Init method accepts a machine name and causes a client application object to be instantiated on the specified machine automation client. |
| Install | The Install method installs the associated application on the machine automation client. The method returns a Boolean value indicating whether the method was successful. |
| InstallEx | The InstallEx method installs the associated application on the machine automation client in extended application mode, such as admin mode, quiet mode, subset mode (which installs only a predefined subset of the package), etc. The InstallEx method allows an installation to be parameterized so as to modify a default installation operation. The method returns a Boolean value indicating whether the method was successful. |
| Uninstall | The Uninstall method uninstalls the associated application from the machine automation client. The method returns a Boolean value indicating whether the method was successful. |
| Source | The Source property indicates the path to the setup program. |
| Destination | The Destination property indicates the installation path for the application on the machine automation client. |
| Username | The Username property indicates the username to be entered into the setup program. |

TABLE 15-continued

Methods and Properties of an Exemplary Application Object

| Application Object Method or Property | Description |
|---|---|
| Organization | The Organization property indicates the organization to be entered into the setup program. |
| Arguments | The Arguments property indicates optional arguments to be passed to the setup program. |
| Drive | The Drive property changes the installation drive (i.e., the drive to which the application will be installed). |
| rebootRequired | The rebootRequired property indicates whether a reboot operation is required for the last action of the installation. An installation script, which may not be initially aware whether a given installation requires a reboot, can read this property from the application object. The rebootRequired property may be a read-only property within the application object. |
| requestFeatureState | The requestFeatureState method requests a desired list of top-level application features to be installed during the installation. The method may also request that a feature be installed in a specified mode (e.g., on a local (target) machine, to be installed on demand, to be set to run from the source, etc). |
| removePreviousVersion | The removePreviousVersion property indicates whether a previous version(s) of the application should be removed during the installation. |
| pidKey | The pidKey property specifies a product code to use when installing a given application. |
| productGUID | The productGUID property indicates the Installer's Product GUID Code for the application. |
| ieUpgrade | The ieUpgrade property indicates how to upgrade a Web browser. |
| buildPathPattern | For product in development, the buildPathPattern property indicates a pattern for a build directory path, which may containing wild-card characters, such as * and ?. This pattern is used when searching for the latest build. This property allows the application object to dynamically build the latest version of the application for testing. |
| GetLatestBuildPath | The GetLatestBuildPath method changes the Source property to the latest build path specified by the buildPathPattern property. |

Figure 2:
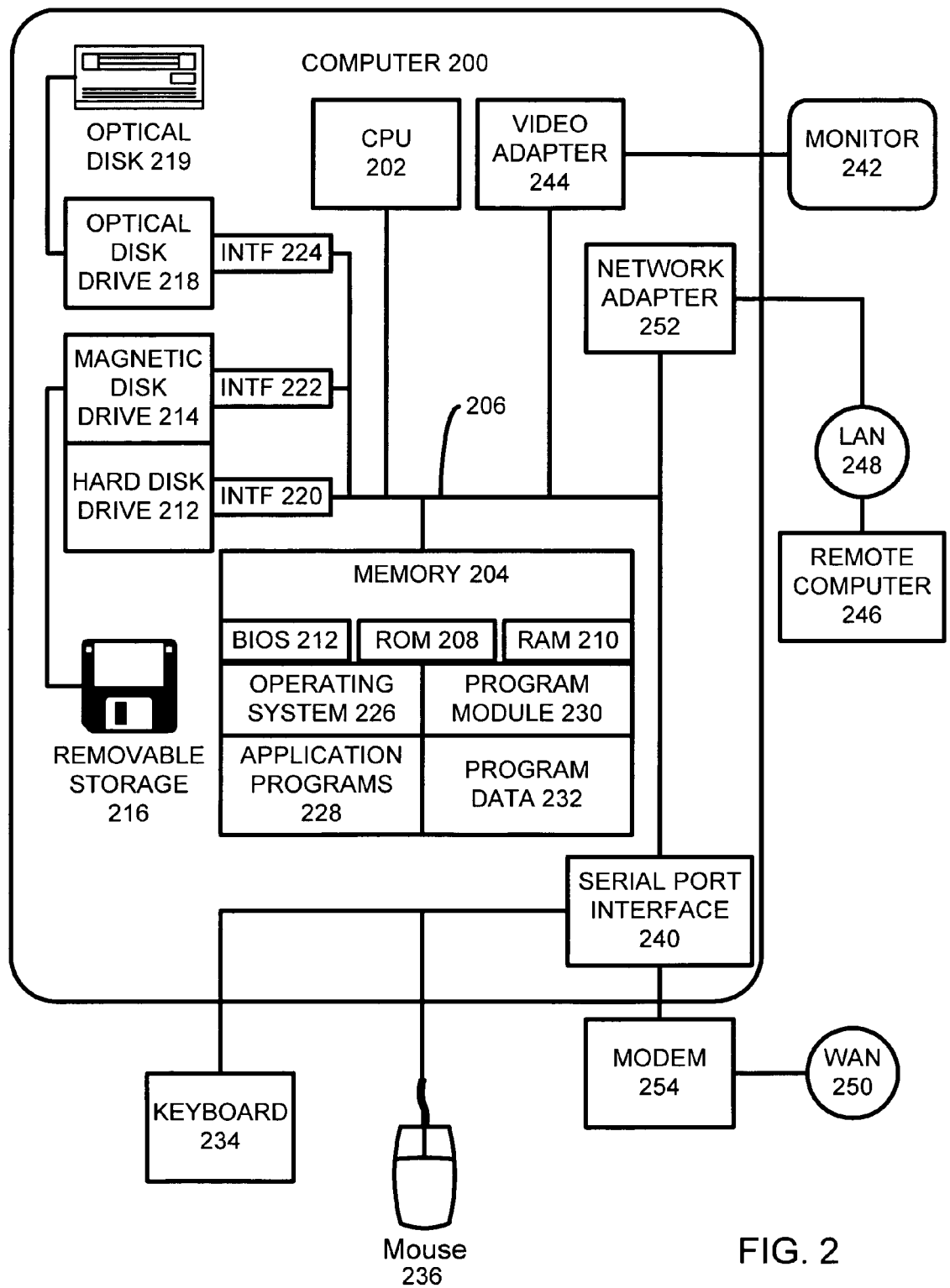
FIG. 2 illustrates an exemplary system useful for implementing an embodiment of the present invention.

FIG. 2 illustrates an exemplary system useful for implementing an embodiment of the present invention. An exemplary computing system for embodiments of the invention includes a general purpose computing device in the form of a conventional computer system 200, including a processor unit 202, a system memory 204, and a system bus 206 that couples various system components including the system memory 204 to the processor unit 200. The system bus 206 may be any of several types of bus structures including a memory bus or memory controller, a peripheral bus and a local bus using any of a variety of bus architectures. The system memory includes read only memory (ROM) 208 and random access memory (RAM) 210. A basic input/output system 212 (BIOS), which contains basic routines that help transfer information between elements within the computer system 200, is stored in ROM 208.

The computer system 200 further includes a hard disk drive 212 for reading from and writing to a hard disk, a magnetic disk drive 214 for reading from or writing to a removable magnetic disk 216, and an optical disk drive 218 for reading from or writing to a removable optical disk 219 such as a CD ROM, DVD, or other optical media. The hard disk drive 212, magnetic disk drive 214, and optical disk drive 218 are connected to the system bus 206 by a hard disk drive interface 220, a magnetic disk drive interface 222, and an optical drive interface 224, respectively. The drives and their associated computer-readable media provide nonvolatile storage of computer readable instructions, data structures, programs, and other data for the computer system 200.

Although the exemplary environment described herein employs a hard disk, a removable magnetic disk 216, and a removable optical disk 219, other types of computer-readable media capable of storing data can be used in the exemplary system. Examples of these other types of computer-readable mediums that can be used in the exemplary operating environment include magnetic cassettes, flash memory cards, digital video disks, Bernoulli cartridges, random access memories (RAMs), and read only memories (ROMs).

A number of program modules may be stored on the hard disk, magnetic disk 216, optical disk 219, ROM 208 or RAM 210, including an operating system 226, one or more application programs 228, other program modules 230, and program data 232. A user may enter commands and information into the computer system 200 through input devices such as a keyboard 234 and mouse 236 or other pointing device. Examples of other input devices may include a microphone, joystick, game pad, satellite dish, and scanner. These and other input devices are often connected to the processing unit 202 through a serial port interface 240 that is coupled to the system bus 206. Nevertheless, these input devices also may be connected by other interfaces, such as a parallel port, game port, or a universal serial bus (USB). A monitor 242 or other type of display device is also connected to the system bus 206 via an interface, such as a video adapter 244. In addition to the monitor 242, computer systems typically include other peripheral output devices (not shown), such as speakers and printers.

The computer system 200 may operate in a networked environment using logical connections to one or more remote computers, such as a remote computer 246. The remote computer 246 may be a computer system, a server, a router, a network PC, a peer device or other common network node, and typically includes many or all of the elements described above relative to the computer system 200. The network connections include a local area network (LAN) 248 and a wide area network (WAN) 250. Such networking environments are commonplace in offices, enterprise-wide computer networks, intranets, and the Internet.

When used in a LAN networking environment, the computer system 200 is connected to the local network 248 through a network interface or adapter 252. When used in a WAN networking environment, the computer system 200 typically includes a modem 254 or other means for establishing communications over the wide area network 250, such as the Internet. The modem 254, which may be internal or external, is connected to the system bus 206 via the serial port interface 240. In a networked environment, program modules depicted relative to the computer system 200, or portions thereof, may be stored in the remote memory storage device. It will be appreciated that the network connections shown are exemplary, and other means of establishing a communication link between the computers may be used.

In an embodiment of the present invention, the computer 200 can represent either a server or a client computer system, wherein the processor 202 executes a machine automation code module and machine automation server objects in a server process and a machine automation client objects in a client process. Although client and server processes are shown in FIG. 1 as been executed on individual computer systems, it should be understood that a single computer may execute both client and server processes in an embodiment of the present invention.

Figure 3:
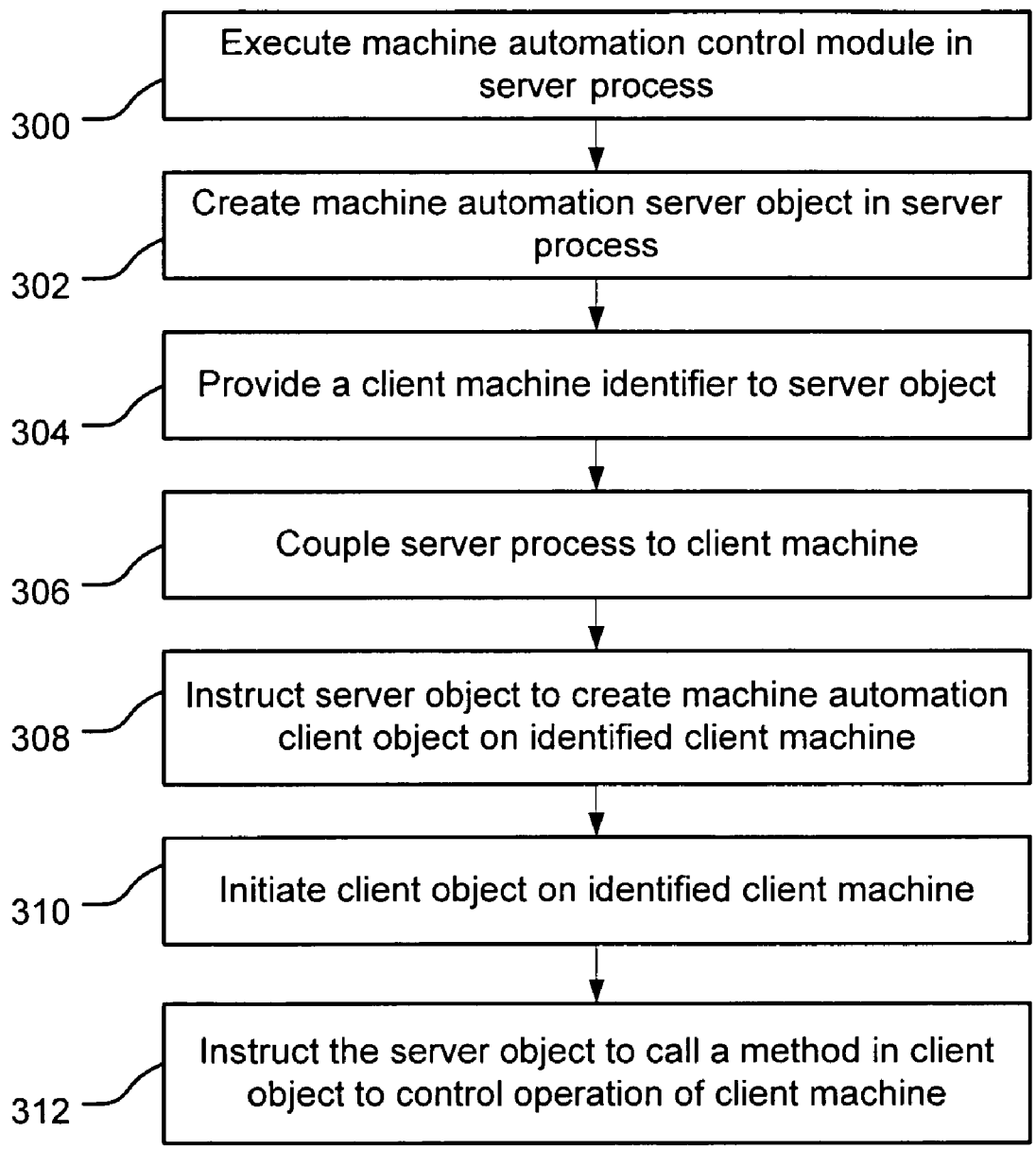
FIG. 3 illustrates a flow diagram of operations for creating and initializing server and client machine objects in an embodiment of the present invention.

FIG. 3 illustrates a flow diagram of operations for creating and initializing server and client machine objects in an embodiment of the present invention. Execution operation 300 executes a machine automation control module in a server process. The server process may be running in a machine automation server system to provide remote control of operations on machine automation client systems. Alternatively, the server process is running in the machine automation client systems to provide local control of operations on the client systems.

Under command of the machine automation control module, creating operation 302 instantiates the machine automation server object in the server process. Under command of the machine automation control module, identifying operation 304 provides a client machine identifier to the machine automation server object. Coupling operation 306 couples the server process to the client machine via a communication mechanism, such as DCOM (if the server process is running on a machine different than the client machine) or COM (if the server process is running in the same machine as the client machine). Instructing operation 308 instructs the machine automation server object to instantiate the machine automation client object on the identified client machine. In an embodiment of the present invention, an instruction provided by instructing operation 308 is received in a command from the machine automation control module.

Creating operation 310 instantiates a machine automation client object on the identified client machine via the communication mechanism (e.g., DCOM or COM). Under command of the machine automation control module, instructing operation 312 instructs the machine automation server object to call a method in the machine automation client object to control operation of the client machine.

Figure 4:
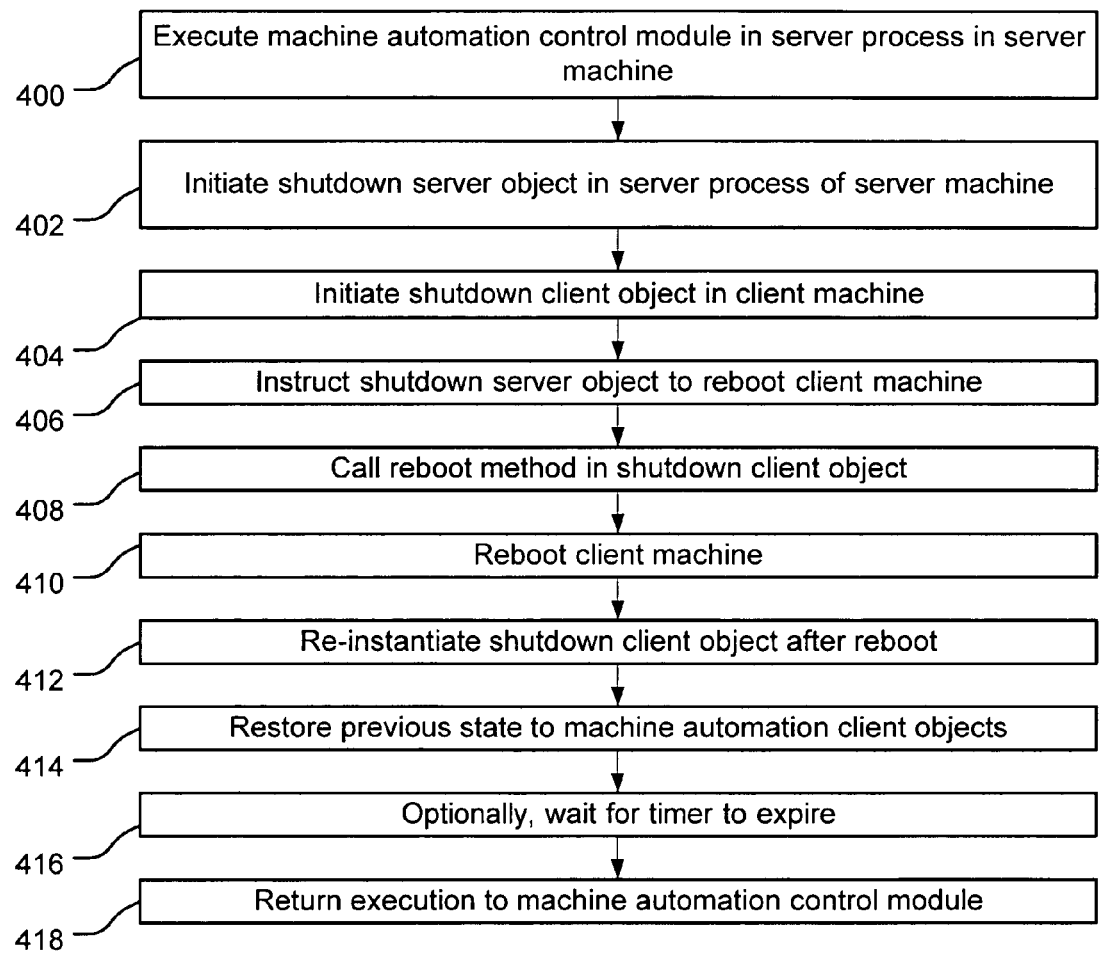
FIG. 4 illustrates a flow diagram of operations for initiating and recovering from a loss of control with a client machine in an embodiment of the present invention.

FIG. 4 illustrates a flow diagram of operations for initiating and recovering from a loss of control with a client machine in an embodiment of the present invention. Execution operation 400 executes a machine automation control module in a server process. Instantiation operation 402 creates a shutdown server object in the server process of the server machine. Under command of the machine automation control module, instantiation operation 404 instructs the shutdown server object to instantiate, via DCOM, a shutdown client object and a client process of the client machine. It should be understood that other communications mechanisms may also be useful to instantiate and communicate with client objects in embodiments of the present invention.

Under command of the machine automation control module, instructing operation 406 instructs the shutdown server object to reboot client machine. In calling operation 408, the shutdown server object calls a reboot method of the shutdown client object in the client machine via DCOM. Rebooting operation 410 reboots the client machine through the reboot method of the shutdown client object to client machine.

Re-instantiating operation 412 causes the shutdown server object to re-instantiate the shutdown client object on the client machine after the client machine has rebooted. In an embodiment of the present invention, the re-instantiation is accomplished as a function of the communication mechanism's reconnection operation. One technique for re-instantiating the shutdown client object may involve the shutdown server object periodically attempting to re-instantiate the shutdown client object on the client machine via the communications mechanism during the reboot period. In this technique, the re-instantiation attempts are only successful after the reboot is complete. If the attempts are unsuccessful for a long enough period of time (as defined by a time out value, such as TimeOut in the Shutdown object), the machine automation server object may return a FALSE status and the machine automation control module can include error handling functionality to notify the user of the failure or to attempt to recover through alternative means (e.g., wait a longer period of time before re-attempting the re-instantiation operation). The default behavior of the re-instantiation operation may also be modified by various properties, including modifications such as waiting for a server-side timer to expire or waiting until a communication is received from the client machine indicating that the rebooting has successfully completed.

Restoring operation 414 restores the previous state (e.g., property values) to the machine automation client object on the client machine via DCOM. Each machine automation server object, for example, can maintain its property values during a reboot on the client, including a client machine identifier. The corresponding machine automation client object, however, is terminated as the client machine reboots, therefore, losing any property values. Upon completion of the reboot operation and re-instantiation of the client object, the server object restores the client object's properties with the appropriate pre-reboot values.

Timer operation 416 optionally causes the shutdown server object to wait until a timer, associated with an automation object timer property (e.g., TimeAfterReboot), has expired. After the shutdown server object detects a shutdown of the client machine (e.g., loses communications with the client object), the shutdown server object restores the connection with the client machine and determines whether explorer.exe (a software module that executes on the client machine) is running. An embodiment of the present invention uses execution of the explorer.exe module as an indication that the client machine has completed the reboot procedure; however, alternative embodiments may employ other indications. If explorer.exe is not running, the shutdown server object retries this query again at a future time (e.g., it continues to poll the client machine). Once the shutdown server object detects that explorer.exe is running, then the shutdown server object starts the timer. In one embodiment, the timer counts down from the value of the automation object timer property. In another embodiment, the timer counts up to the automation object timer property, wherein the server compares the value of the timer with the value of the automation object timer property to determine if the timer has expired.

If the automation object timer property value is non-zero, the timer operation 416 delays the machine automation server object's return of control to the machine automation control module. The delay may be used to allow certain start up processes to complete on the client machine before control returns to the machine automation control module for additional automation instructions. After the timer expires, return operation 418 returns control to the machine automation control module for the next instruction.

The embodiments of the invention described herein are implemented as logical steps in one or more computer systems. The logical operations of the present invention are implemented (1) as a sequence of processor-implemented steps executing in one or more computer systems and (2) as interconnected machine modules within one or more computer systems. The implementation is a matter of choice, dependent on the performance requirements of the computer system implementing the invention. Accordingly, the logical operations making up the embodiments of the invention described herein are referred to variously as operations, steps, objects, or modules.

The above specification, examples and data provide a complete description of the structure and use of one or more exemplary embodiments of the invention. Since many embodiments of the invention can be made without departing from the spirit and scope of the invention, the invention resides in the claims hereinafter appended.

We claim:

1. A machine automation system for automating control of a client machine under control of a server process, the system comprising:
    a predefined machine automation server object adapted to execute in the server process;
    a predefined machine automation client object class adapted to execute on the client machine in communication with the machine automation server object and the predefined machine automation client object class comprises one or more machine automation client objects for executing testing methods on the client machine; and
    a machine automation control module instantiating a machine automation server object of the machine automation server object class in the server process and instructing the machine automation server object to instantiate one of the machine automation client objects of the machine automation client object on the client machine to control operation of the client machine; and
    the machine automation server object includes a shutdown server object executing in the server process of a server machine, the machine automation client object includes a shutdown client object executing in a client process of the client machine, and the machine automation control module instructs the shutdown server object to cause the shutdown client object to reboot the client machine and to re-establish communications with the shutdown client object via a communications mechanism after rebooting of the client machine completes.

2. The machine automation system of claim 1 further comprising:
    a machine identifier identifying the client machine on which the machine automation client object is to be instantiated; and
    a machine identifier source providing the machine identifier to the machine automation server object to initiate instantiation of the machine automation client object on the client machine.

3. The machine automation system of claim 1 wherein the machine automation control module continues execution after rebooting of the client machine completes.

4. The machine automation system of claim 3 further comprising:
    a timeout field of the machine automation server object for storing a timeout value specifying an amount of time the machine automation server object waits to return control to the machine automation control module after rebooting of the client machine completes.

5. The machine automation system of claim 1 wherein the machine automation control module continues execution after the shutdown server object causes the shutdown client object to reboot the client machine and before rebooting of the client machine completes.

6. The machine automation system of claim 1 wherein the machine automation control module instructs the shutdown server object to cause the shutdown client object to log off of the client machine and to re-log in to the client machine using a predetermined user name.

7. The machine automation system of claim 6 wherein the predetermined user name is recorded in a system registry of the client machine and read from the system registry by the machine automation client object to re-log in to the client machine.

8. The machine automation system of claim 1 wherein the machine automation control module instructs the shutdown server object to re-log in to the client machine after rebooting completes.

9. The machine automation system of claim 1 wherein the machine automation control module instructs the machine automation server object to cause the machine automation client object to access a system registry of the client machine.

10. The machine automation system of claim 1 wherein the machine automation control module instructs the machine automation server object to cause the machine automation client object to return system information about the client machine to the machine automation server object.

11. The machine automation system of claim 1 wherein the machine automation control module instructs the machine automation server object to cause the machine automation client object to return to the machine automation server object a snapshot of a system registry of the client machine.

12. The machine automation system of claim 1 wherein the machine automation control module instructs the machine automation server object to cause the machine automation client object to return to the machine automation server object a snapshot of a file system of the client machine.

13. The machine automation system of claim 1 wherein the machine automation control module instructs the machine automation server object to cause the machine automation client object to install an application on the client machine.

14. The machine automation system of claim 1 further comprising:
a first machine identifier received by the machine automation server object identifying the client machine;
another machine automation server object adapted to execute in the server process;
a second machine identifier received by said another machine automation server object identifying another client machine; and
another machine automation client object identified by the second machine identifier and adapted to execute on said another client machine in communication with said another machine automation server object via a communications mechanism.

15. A method for automating control of a client machine under control of a server process, the method comprising:
executing a machine automation control module in the server process;
instantiating a machine automation server object of a predefined machine automation server object class in the server process, under command of the machine automation control module;
instructing the machine automation server object to instantiate a machine automation client object of a predefined machine automation client object class on the client machine;
instructing the machine automation server object to cause the machine automation client object to reboot the client machine; and
re-establishing communications between the machine automation server object and the machine automation client object via a communications mechanism after rebooting of the client machine completes.

16. The method of claim 15 further comprising:
providing the machine automation server object with an identifier of the client machine on which the machine automation client object is to be instantiated; and
instantiating the machine automation client object on the client machine specified by the identifier.

17. The method of claim 15 further comprising:
restoring a value of a property of the machine automation client object after rebooting of the client machine completes.

18. The method of claim 15 further comprising:
executing a first instruction of the machine automation control module that instructs the machine automation server object to cause the machine automation client object to reboot the client machine; and
delaying execution of a subsequent instruction of the machine automation control module until after rebooting of the client machine completes.

19. The method of claim 18 wherein the delaying operation delays execution of a subsequent instruction of the machine automation control module until after a specified time after rebooting of the client machine completes.

20. The method of 15 further comprising:
executing a first instruction of the machine automation control module that instructs the machine automation server object to cause the machine automation client object to reboot the client machine; and
executing a subsequent instruction of the machine automation control module after the machine automation server object causes the machine automation client object to reboot the client machine and before rebooting of the client machine completes.

21. The method of claim 15 further comprising:
executing the server process in a server machine;
instructing the machine automation server object to cause the machine automation client object to log off of the client machine; and
instructing the machine automation server object to cause the machine automation client object to re-log in to the client machine using a predetermined user name.

22. The method of claim 21 further comprising:
recording the predetermined user name in a system registry of the client machine; and
instructing the machine automation server object to cause the machine automation client object to log into the client machine using the predetermined user name read from the system registry.

23. The method of 15 further comprising:
executing a first instruction of the machine automation control module that instructs the machine automation server object to cause the machine automation client object to reboot the client machine; and
executing a subsequent instruction of the machine automation control module after the machine automation server object causes the machine automation client object to reboot the client machine and before rebooting of the client machine completes.

24. The method of claim 15 further comprising:
executing the server process in a server machine;
instructing the machine automation server object to cause the machine automation client object to reboot the client machine; and
instructing the machine automation server object to cause the machine automation client object to re-log in to the client machine after rebooting completes.

25. The method of claim 15 further comprising:
instructing the machine automation server object to cause the machine automation client object to access a system registry of the client machine, under command of the machine automation control module.

26. The method of claim 25 wherein the operation of instructing the machine automation server to cause the machine automation client object to access the system registry comprises:
instructing the machine automation server object to cause the machine automation client object to return to the machine automation server object a snapshot of the system registry of the client machine, under command of the machine automation control module.

27. The method of claim 15 further comprising:
instructing the machine automation server object to cause the machine automation client object to return to the machine automation server object a snapshot of a file system of the client machine, under command of the machine automation control module.

28. The method of claim 15 further comprising:
instructing the machine automation server object to cause the machine automation client object to return system information about the client machine to the machine automation server object, under command of the machine automation control module.

29. The method of claim 15 further comprising:
instructing the machine automation server object to cause the machine automation client object to install an application on the client machine, under command of the machine automation control module.

30. The method of claim 15 further comprising:
providing to the machine automation server object a first machine identifier identifying the client machine;
instantiating another machine automation server object of the machine automation server object class in the server process, under command of the machine automation control module;
providing to said another machine automation server object a second machine identifier identifying another client machine;
instructing said another machine automation server object to instantiate another machine automation client object of the machine automation client object class on said another client machine via a communications mechanism; and
instructing said another machine automation server object to cause said another machine automation client object to control operation of said another client machine.

31. A computer program storage medium readable by a computer system and encoding a computer program for executing a computer process automating control of a client machine under control of a server process, the computer process comprising:
executing a machine automation control module in the server process;
instantiating a machine automation server object of a predefined machine automation server object class in the server process, under command of the machine automation control module;
instructing the machine automation server object to instantiate a machine automation client object of a predefined machine automation client object class on the client machine;
instructing the machine automation server object to cause the machine automation client object to reboot the client machine; and
re-establishing communications between the machine automation server object and the machine automation client object via a communications mechanism after rebooting of the client machine completes.

32. A computer program storage medium readable by a computer system and encoding a computer program for executing on a computer system a computer process for automating control of a first client machine and a second client machine under control of a server process via a communications mechanism, for testing software on the first client machine and the second client machine, the computer process comprising:
executing a machine automation control module in the server process;
instantiating a first machine automation server object of a predefined machine automation server object control module;
instructing the first machine automation server object to instantiate a first machine automation client object of a predefined machine automation client class on the first client machine, and the first machine automation client object for executing one or more testing methods on the client machine;
instantiating a second machine automation server object of the machine automation server object class in the server process, under command of the machine automation control module;
instructing the second machine automation server object to the instantiate a second machine automation client object of the machine automation client object class on the second client machine, and the second machine automation client object for executing one or more testing methods on the client machine;
instructing the first machine automation server object to cause the first machine automation client object to control testing of the first client machine;
instructing the second machine automation server object to cause the second machine automation client object to control testing of the second client machine;
executing the server process in a server machine;
instructing the first machine automation server object to cause the first machine automation client object to reboot the first client machine;
instructing the second machine automation server object to cause the second machine automation client object to reboot the second client machine;
re-establishing communications between the first machine automation server object and the first machine automation client object via the communications mechanism after rebooting of the first client machine completes; and
re-establishing communications between the second machine automation server object and the second machine automation client object via the communications mechanism after rebooting of the second client machine completes.

33. The computer program product of claim 32 wherein the computer process further comprises: rebooting the first client machine, responsive to the operation of instructing the first machine automation server object to cause the first machine automation client object to reboot the first client machine; and rebooting the second client machine concurrently with the operation of rebooting the first client machine, responsive to the operation of instructing the second machine automation server object to cause the second machine automation client object to reboot the second client machine.

* * * * *